No. 733,193. PATENTED JULY 7, 1903.
R. B. HAIN.
VARIABLE SPEED AND REVERSING MECHANISM.
APPLICATION FILED FEB. 4, 1903.
NO MODEL.
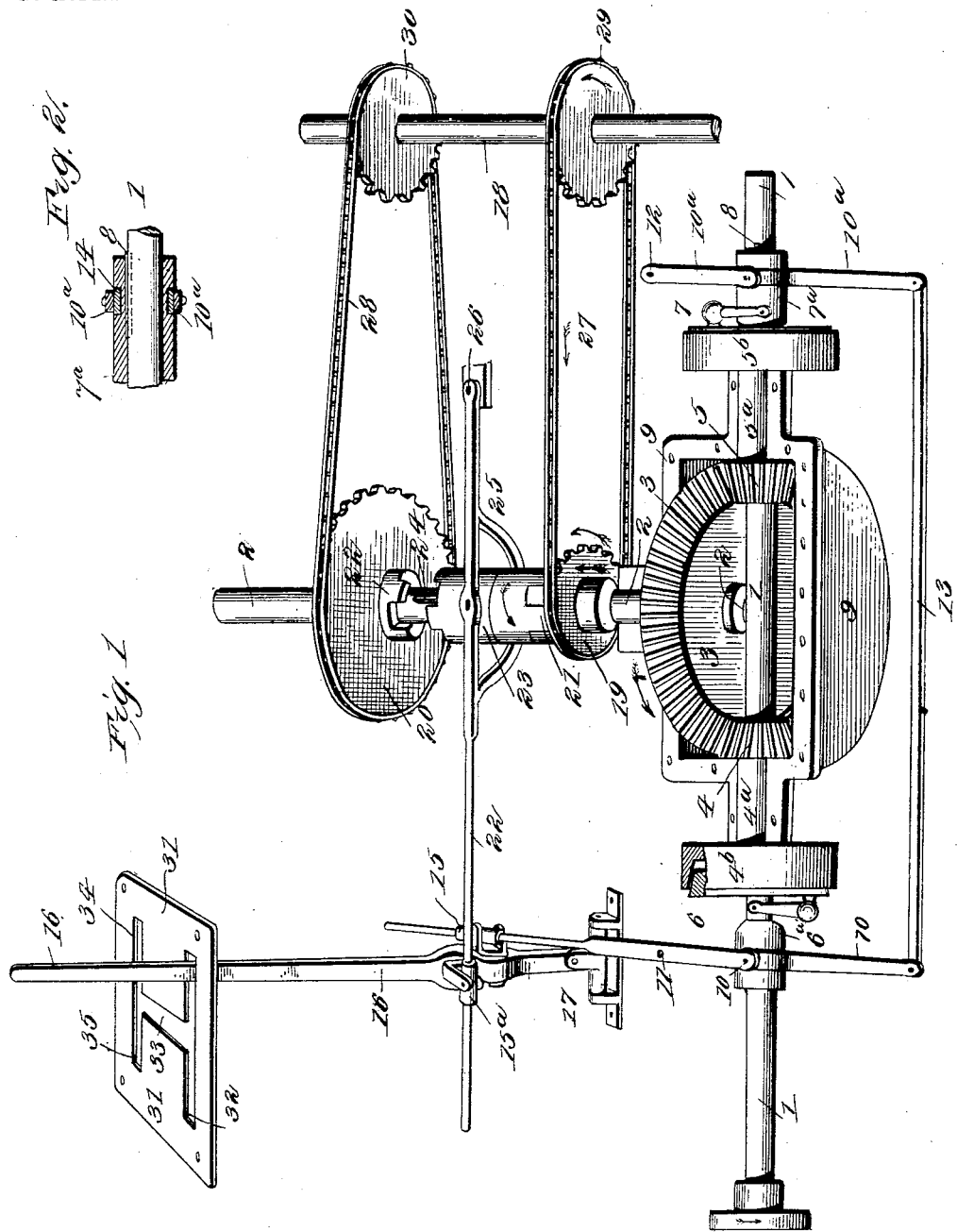
WITNESSES:
INVENTOR,
Ralph B. Hain.
BY Munn & Co.
ATTORNEYS.

No. 733,193.                                                    Patented July 7, 1903.

UNITED STATES PATENT OFFICE.

RALPH BENTON HAIN, OF LOS ANGELES, CALIFORNIA, ASSIGNOR TO AUTO VEHICLE COMPANY, OF LOS ANGELES, CALIFORNIA, A CORPORATION OF CALIFORNIA.

VARIABLE-SPEED AND REVERSING MECHANISM.

SPECIFICATION forming part of Letters Patent No. 733,193, dated July 7, 1903.

Application filed February 4, 1903. Serial No. 141,816. (No model.)

*To all whom it may concern:*

Be it known that I, RALPH BENTON HAIN, a citizen of the United States, and a resident of Los Angeles, in the county of Los Angeles and State of California, have made certain new and useful Improvements in Variable-Speed and Reversing Mechanism, of which the following is a specification.

My invention is an improved mechanism for producing variable speed or reversing and is applicable to machinery of various kinds, particularly automobiles or other motor-driven vehicles.

The mechanism is adapted for driving forward at different speeds or for reversing and driving backward at different speeds.

The details of construction, arrangement, and operation are as hereinafter described, reference being had to the accompanying drawings, in which—

Figure 1 is a perspective view of my improved mechanism, and Fig. 2 a detail section of one of the parts thereof.

The numeral 1 indicates the driving-shaft, and 2 the driven shaft, which is arranged at right angles to the former and provided on its inner end with a master bevel-gear 3. Two bevel-pinions 4 and 5 engage the wheel 3, the same being mounted on the shaft 1 and rigidly connected with sleeves $4^a$ and $5^a$, which are in turn rigidly connected with the box members $4^b$ and $5^b$ of friction-clutches. The other members of the clutches (indicated by 6 and 7) are rigidly connected, respectively, with sleeves $6^a$ and $7^a$, which are slidably mounted on the shaft 1 and have a spline connection 8 therewith, as shown in Fig. 2. Thus the sleeves $6^a$ and $7^a$ and the clutch members 6 and 7 always rotate with the driving-shaft 1 in the same direction.

The gearing 3 4 5 is in practice inclosed in a boxing 9, a portion of which is removed for better illustration of the arrangement of parts.

For the purpose of adjusting the clutch members 6 7 through the medium of the splined sleeves $6^a$ and $7^a$ I employ two levers 10 and $10^a$, which are pivoted, respectively, at 11 and 12 and connected at their outer ends by a bar or rod 13. It will be understood that these levers are bifurcated to adapt them for attachment to opposite sides of the ring 14, (see Fig. 2,) which is arranged in a circumferential recess formed in each of the sleeves $6^a$ and $7^a$. It will be apparent that this ring does not revolve with the sleeves, but serves to connect the levers 10 and $10^a$ with the sleeves, as required, to slide the latter on the driving-shaft 1. The lever 10 is extended, as shown, and slidable in a sleeve 15, which is jointed by suitable means to the hand-lever 16. The latter is pivoted at 17, so that it is adapted to be shifted forward and back or laterally, as conditions require—that is to say, the lever 16 is adapted for universal movement on its pivots.

The driven shaft 2 is geared with a counter-shaft or axle 18 by the following means: A small sprocket-wheel 19 and a large sprocket-wheel 20 are mounted loose on the shaft 2 and provided on their inner sides with half-clutches 21 and 22, respectively, between which is arranged a slidable clutch member 23, the same having a spline connection 24 with the shaft 2 and being adapted to engage either of the clutch members 21 22. Such clutch member 23 is thrown right or left for engagement with either sprocket 19 or 20 by means of a lever 25, which is pivoted at 26 and whose forward end works in a sleeve $15^a$, which is connected by a suitable joint with the aforesaid hand-lever 16. Chains 27 and 28 run from the respective sprockets 19 20 to sprocket-wheels 29 30, which are fast on the driven shaft or axle 18.

The hand-lever 16 projects through and works in an H-shaped guide-plate 31, which is in practice secured to a fixed portion of a frame or to the bottom of the vehicle-body in the case of an automobile.

The operation of my invention is as follows: In the position of the lever 16 (illustrated in the drawings) the levers 10 and $10^a$ are set at such an angle that the clutch member 6 on the left is disengaged from the corresponding box $4^b$, while the clutch member 7 on the right is engaged with the clutch-box $5^b$. Consequently the parts 4, 4ª, and 4ᵇ, which are rigidly connected, are left free to rotate on the driven shaft 1, while the corresponding parts 5, 5ª, and 5ᵇ are rotated in the direction indicated by arrows, this result being effected by reason of the fact that the sleeve 7ª is splined to the shaft 1. The master-gear 3 is therefore driven to the left, and the splined clutch member 23 being engaged with the smaller sprocket-wheel 19 it results that the axle or shaft 18 is driven through the medium of the chain 27. It will be understood that the large sprocket-wheel 20 runs free on the driven shaft 2 in the same manner as the bevel-pinion 4 and its connected clutch run free on the driving-shaft 1. When the parts are so adjusted, the machine will be driven forward at a relatively slow rate of speed. If now the lever 16 be shifted to the forward end 32 of the H-shaped slot, the clutch-levers 10 10ª will be shifted, and consequently the clutch member 7 will be disengaged, and the clutch member 6 will be brought into action and locked with the box member 4ᵇ, whereby the bevel-pinion 5 will be left free to rotate, and the pinion 4 will drive the master-gear 3 in the reverse direction from that before described. Consequently the small sprocket-wheel 19 will be reversed in rotation, with the result that the axle or shaft 18 will be similarly reversed. Thus the manipulation of the lever 16, as described, effects the reversal of the driven axle at the same speed as before—that is to say, at low speed. If the hand-lever 16 be shifted laterally through the central portion 33 of the H-shaped slot and brought back to the rear end of the part 34 of said slot, it is apparent, the clutches 4ᵇ and 6 and 5ᵇ and 7 remaining in the position shown in the drawings, that the clutch-lever 22 will be caused to shift the clutch member 23 into engagement with the half-clutch 22 of the sprocket-wheel 20, and thereby the axle or shaft 18 will be driven at a relatively high speed by reason of the greater size of the sprocket-wheel 20 as compared with the wheel 19. Again, if the hand-lever 16 be shifted to the forward end 35 of the right-hand portion of the H-shaped slot the clutch-levers 10 and 10ª will be shifted so as to disengage the clutch members 5ᵇ and 7 and engage the clutch members 4ᵇ and 6, so that the mechanism will be reversed while the relatively high speed is continued. It is further apparent that if the hand-lever 16 be adjusted in the center of the transverse portion 33 of the H-shaped slot all the clutch members will be disengaged, so that the shaft 2 will not be driven in either direction. In the case of an automobile this will be the position of the hand-lever when it is desired to coast.

It will be seen that by my invention a simple manipulation of the hand-lever 16 enables the operator to drive the machine forward at a fast or slow rate or to quickly reverse the same and drive it backward at a fast or slow rate.

What I claim is—

1. The combination, with a driven shaft and a master-gear and sprocket-wheels loose on said shaft, of a clutch member which is splined with the driven shaft and adapted to engage either sprocket-wheel, a driving-shaft, clutches mounted thereon and pinions rigidly connected with the respective clutches and engaging the master-gear, pivoted levers suitably connected with each other and with the respective clutches on the driving-shaft, a hand-lever pivoted and adapted for shifting backward or forward and laterally, and a lever connecting it with the clutch member of the aforesaid sprocket-wheels, substantially as shown and described.

2. The combination, with the driving-shaft and a driven shaft geared together and the former provided with clutches, levers suitably connected with said clutches and with each other and a hand-lever which is jointed to one of the clutch-levers and adapted to be shifted forward and back for alternately engaging or disengaging the clutches, for reversing the rotation of the driven shaft, substantially as shown and described.

3. The combination, with the splined driven shaft and differential sprocket-wheels mounted loose thereon, of a clutch member which is slidable between said wheels, a lever for shifting said member, a driving-shaft arranged at right angles to the driven shaft, meshing gears operatively connecting the two shafts, and slidable clutches mounted on the driving-shaft, levers connected with the clutches on the said shaft, means for connecting such levers whereby they move together for disengaging one clutch member as the other engages, a hand-lever which is operatively connected with the three aforementioned clutch-levers, a shaft or axle arranged parallel to the driven shaft, sprocket-wheels keyed on such axle, and chains connecting the axle-sprockets with the differential wheels of the driven shaft, as shown and described.

4. The combination, with a driving-shaft, a driven shaft arranged at right angles thereto, sprocket-wheels mounted loose on the driven shaft and pinions and clutch members mounted loose on the driving-shaft, of clutch members which are splined on the driving-shaft and adapted to slide as described, levers connected with such slidable members, a third lever, and a clutch member arranged between the sprocket-wheels on the driven shaft, and a hand-lever pivoted in the manner described and operatively connected with the clutch-levers, as specified.

5. The combination with the driving-shaft, the driven shaft, sprocket-wheels, and a master-gear mounted on said driven shaft, of pinions on the driving-shaft engaging the master-gear, clutches on the driving-shaft and levers connected with the same, a splined clutch which is slidable between and adapted to engage the sprocket-wheels on the driven shaft, a lever, for shifting such clutch, a pivoted hand-lever loosely connected with the three clutch-levers and arranged vertically, and a plate having an H-shaped guide-slot in which said hand-lever is adapted to be guided and adjusted in the manner described.

RALPH BENTON HAIN.

Witnesses:
WILLIAM M. CAMERON,
CARROLL S. HARTMAN.